(12) United States Patent
Nicora et al.

(10) Patent No.: US 10,485,170 B2
(45) Date of Patent: Nov. 26, 2019

(54) DEBRIS REMOVAL SYSTEM FOR AN AGRICULTURAL HARVESTER AND RELATED EXTRACTORS

(71) Applicant: CNH Industrial America, LLC, New Holland, PA (US)

(72) Inventors: Fabio Nicora, Belo Horizont (BR); Joao Augusto Marcolin Lucca, Sao Pedro (BR)

(73) Assignee: CNH Industrial America LLC, New Holland, PA (US)

( * ) Notice: Subject to any disclaimer, the term of this patent is extended or adjusted under 35 U.S.C. 154(b) by 139 days.

(21) Appl. No.: 15/709,745

(22) Filed: Sep. 20, 2017

(65) Prior Publication Data

US 2019/0082600 A1    Mar. 21, 2019

(51) Int. Cl.
*A01D 45/10* (2006.01)
*A01F 29/06* (2006.01)
(Continued)

(52) U.S. Cl.
CPC ............ *A01D 45/10* (2013.01); *A01F 12/444* (2013.01); *A01F 29/06* (2013.01); *B07B 4/02* (2013.01);
(Continued)

(58) Field of Classification Search
CPC ...... A01D 45/10; A01D 46/285; A23N 15/02; B07B 4/02; B07B 4/025; B07B 9/02; A01F 12/444; A01F 29/06
See application file for complete search history.

(56) References Cited

U.S. PATENT DOCUMENTS

| 3,788,048 A | * | 1/1974 | Stiff | ...................... A01D 45/10 |
| | | | | 209/250 |
| 3,925,199 A | | 12/1975 | Quick | |

(Continued)

FOREIGN PATENT DOCUMENTS

| CN | 2656492 | 11/2004 |
| CN | 105970365 | 9/2016 |

(Continued)

OTHER PUBLICATIONS

European Search Report for PCT Application No. PCT/US2018/051975 dated Dec. 11, 2018 (13 pages).

*Primary Examiner* — Arpad Fabian-Kovacs
(74) *Attorney, Agent, or Firm* — Peter K. Zacharias; Patrick M. Sheldrake

(57) ABSTRACT

A debris removal system for an agricultural harvester may include an extractor having an extractor housing defining a central airflow channel for directing debris through the extractor from a central inlet to a central outlet. The extractor housing may further define an outer airflow channel surrounding the central airflow channel. The outer airflow channel may define a flow path between an outer housing inlet and an outer airflow outlet. Additionally, the extractor housing may include an internal divider wall extending between the central and outer airflow channels. Moreover, the system may include at least one flow-generating device provided in operative association with the housing. The flow-generating device(s) may be configured to generate an airflow directed through the outer airflow channel, wherein the airflow generates a negative pressure within the central airflow channel that draws the debris into the extractor housing via the central airflow inlet.

20 Claims, 8 Drawing Sheets

(51) Int. Cl.
*A01F 12/44* (2006.01)
*B07B 4/02* (2006.01)
*B07B 7/086* (2006.01)
*B07B 9/02* (2006.01)

(52) U.S. Cl.
CPC .............. *B07B 4/025* (2013.01); *B07B 7/086* (2013.01); *B07B 9/02* (2013.01)

(56) References Cited

U.S. PATENT DOCUMENTS

| | | | | |
|---|---|---|---|---|
| 3,962,072 A | * | 6/1976 | Ramacher | A01D 51/002 209/140 |
| 4,364,222 A | * | 12/1982 | Ramacher | A01D 51/002 209/139.1 |
| 4,511,462 A | | 4/1985 | Folsberg | |
| 4,924,662 A | | 5/1990 | Quick | |
| 5,042,240 A | * | 8/1991 | Rocca | A01D 46/00 198/516 |
| 5,069,024 A | * | 12/1991 | Riberio Pinto | A01D 45/10 56/12.8 |
| 5,092,110 A | | 3/1992 | Dommert | |
| 5,953,891 A | * | 9/1999 | Leigers | A01D 45/10 460/99 |
| 6,363,700 B1 | | 4/2002 | Fowler | |
| 6,869,356 B2 | * | 3/2005 | Hinds | A01D 45/10 460/70 |
| 8,113,353 B2 | * | 2/2012 | Redekop | A01D 90/02 209/137 |
| 8,591,301 B2 | * | 11/2013 | Redekop | A01D 45/028 460/100 |
| 9,119,346 B2 | | 9/2015 | Vergote | |
| 9,456,547 B2 | * | 10/2016 | Cazenave | A01D 45/10 |
| 2009/0124309 A1 | * | 5/2009 | Redekop | A01D 45/02 460/100 |
| 2010/0132326 A1 | * | 6/2010 | Berthet | A01D 46/285 56/328.1 |
| 2010/0291980 A1 | * | 11/2010 | Ricketts | A01D 45/02 460/26 |
| 2014/0069471 A1 | * | 3/2014 | Cross | A01D 33/04 134/147 |
| 2014/0144118 A1 | * | 5/2014 | Le Neve | A01D 46/285 56/328.1 |
| 2014/0221060 A1 | * | 8/2014 | Le Neve | A01D 46/285 460/143 |
| 2015/0201553 A1 | * | 7/2015 | Kalverkamp | A01D 33/04 209/472 |

FOREIGN PATENT DOCUMENTS

WO WO 2010/018457 2/2010
WO WO 2017/013126 1/2017

* cited by examiner

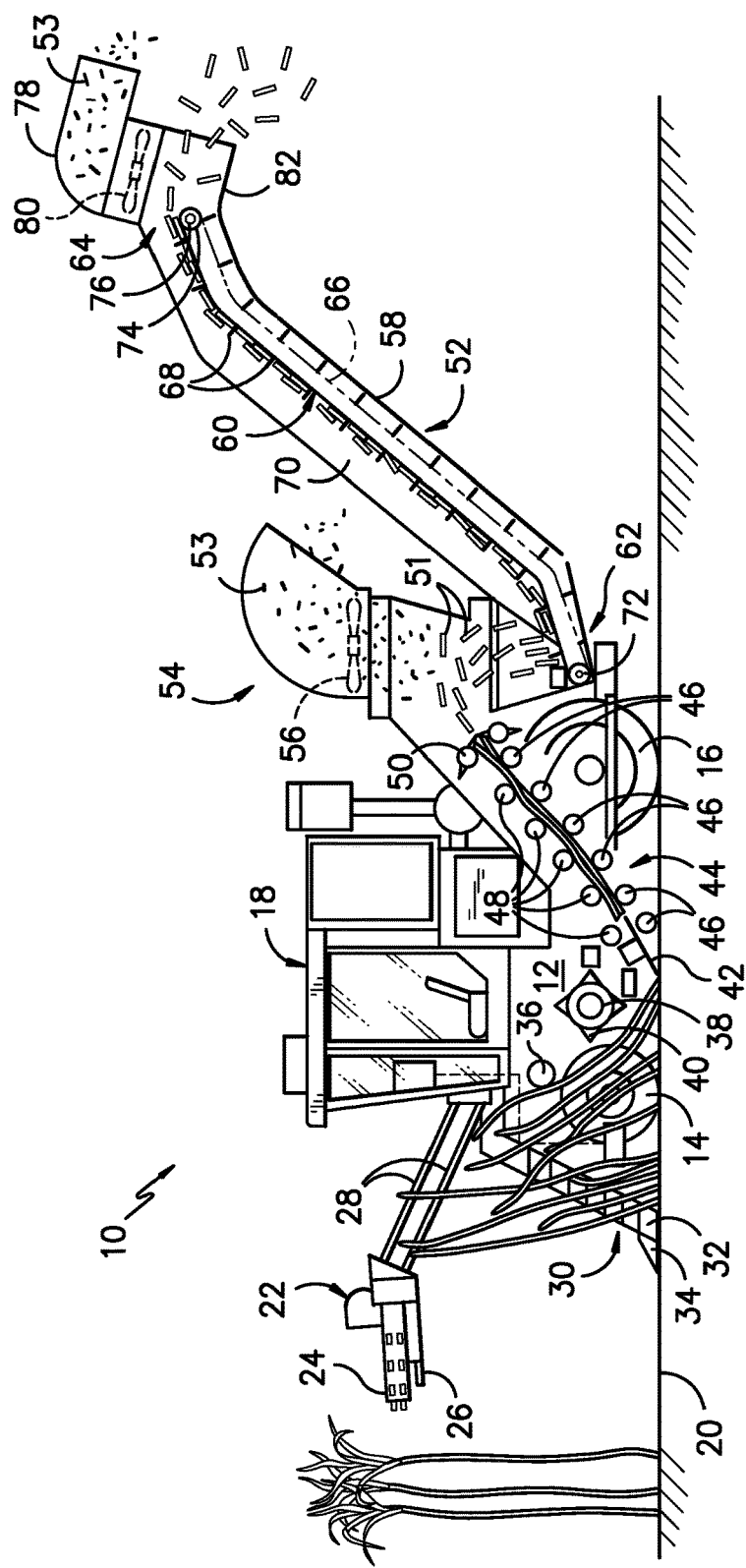
FIG. -1-
(PRIOR ART)

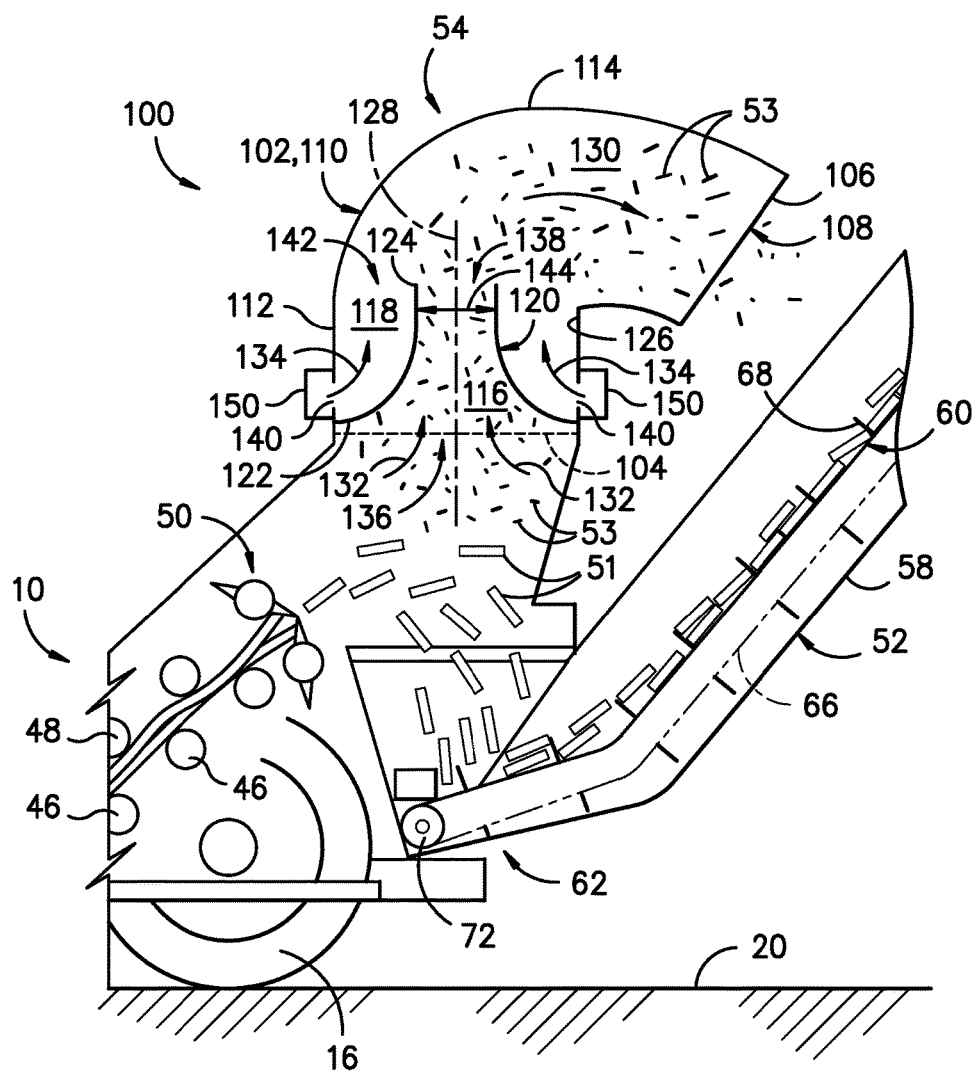
FIG. -2-

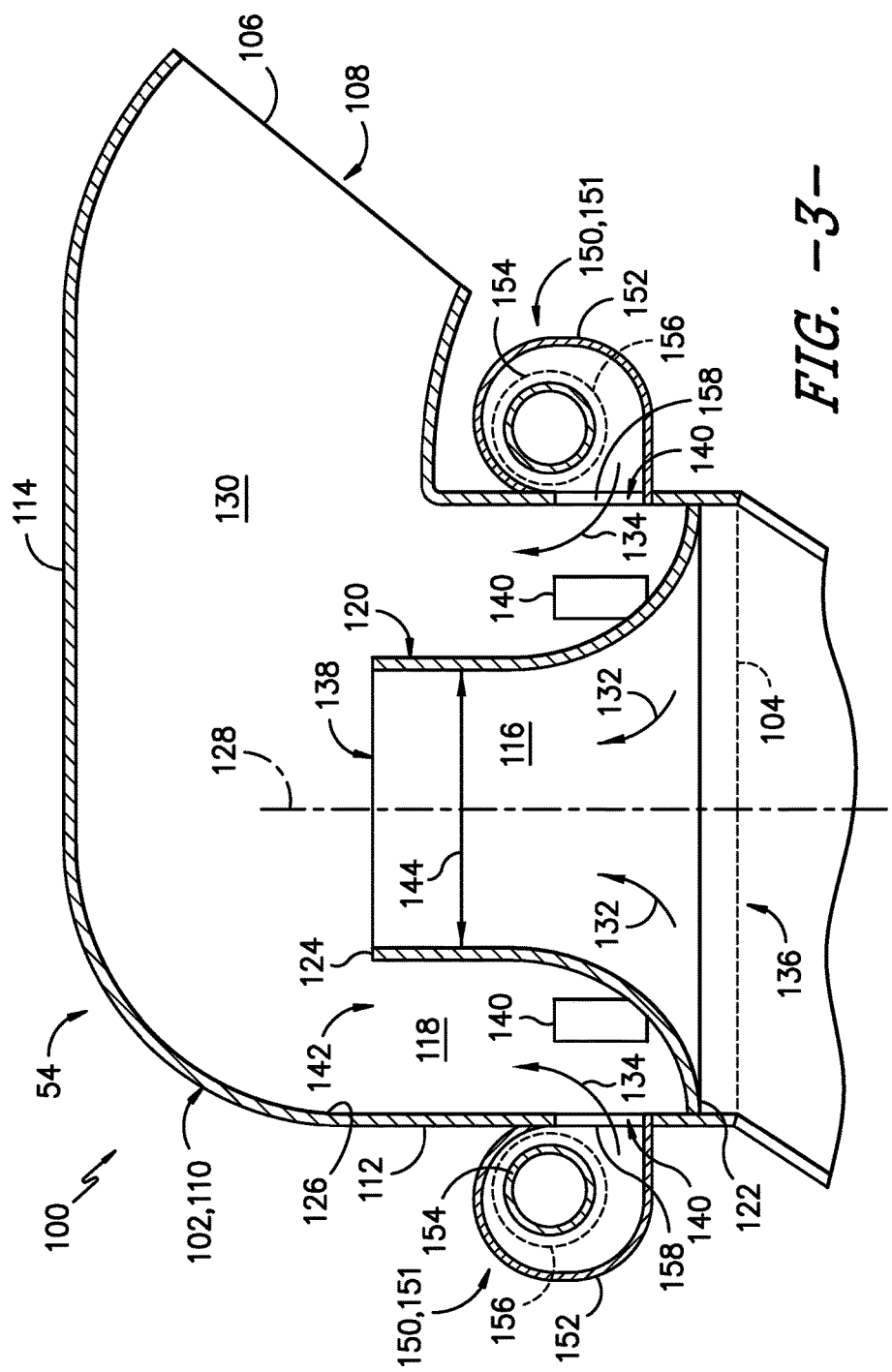

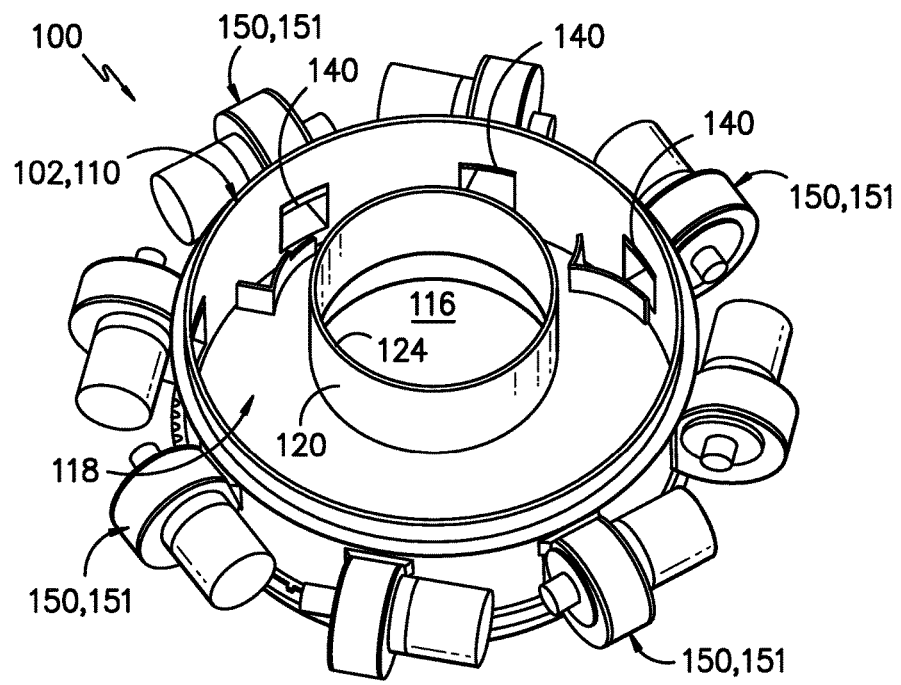
FIG. -4-
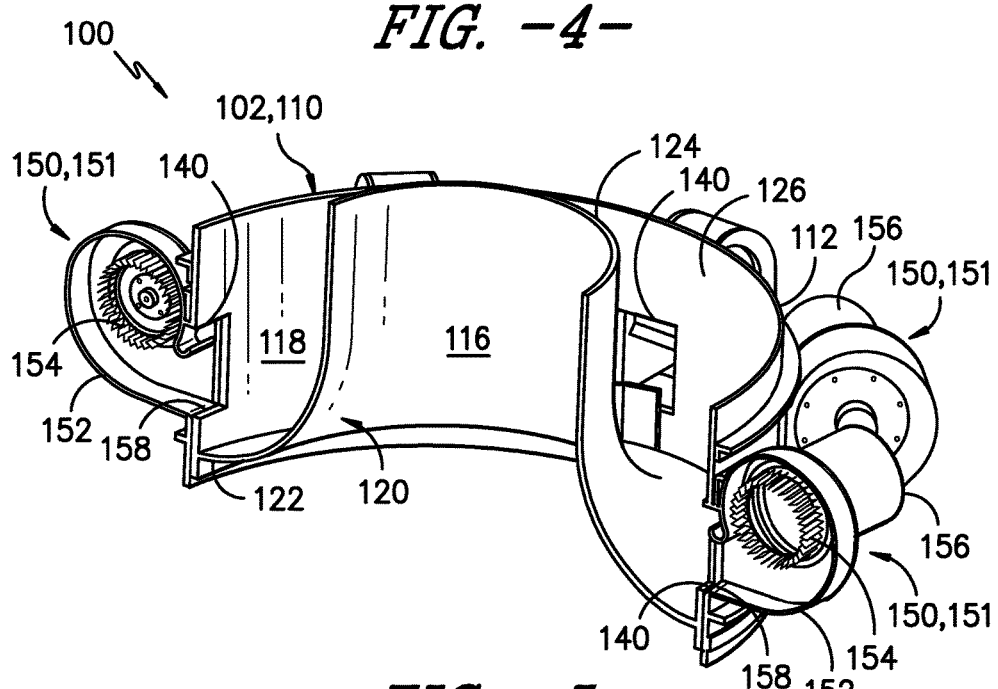
FIG. -5-

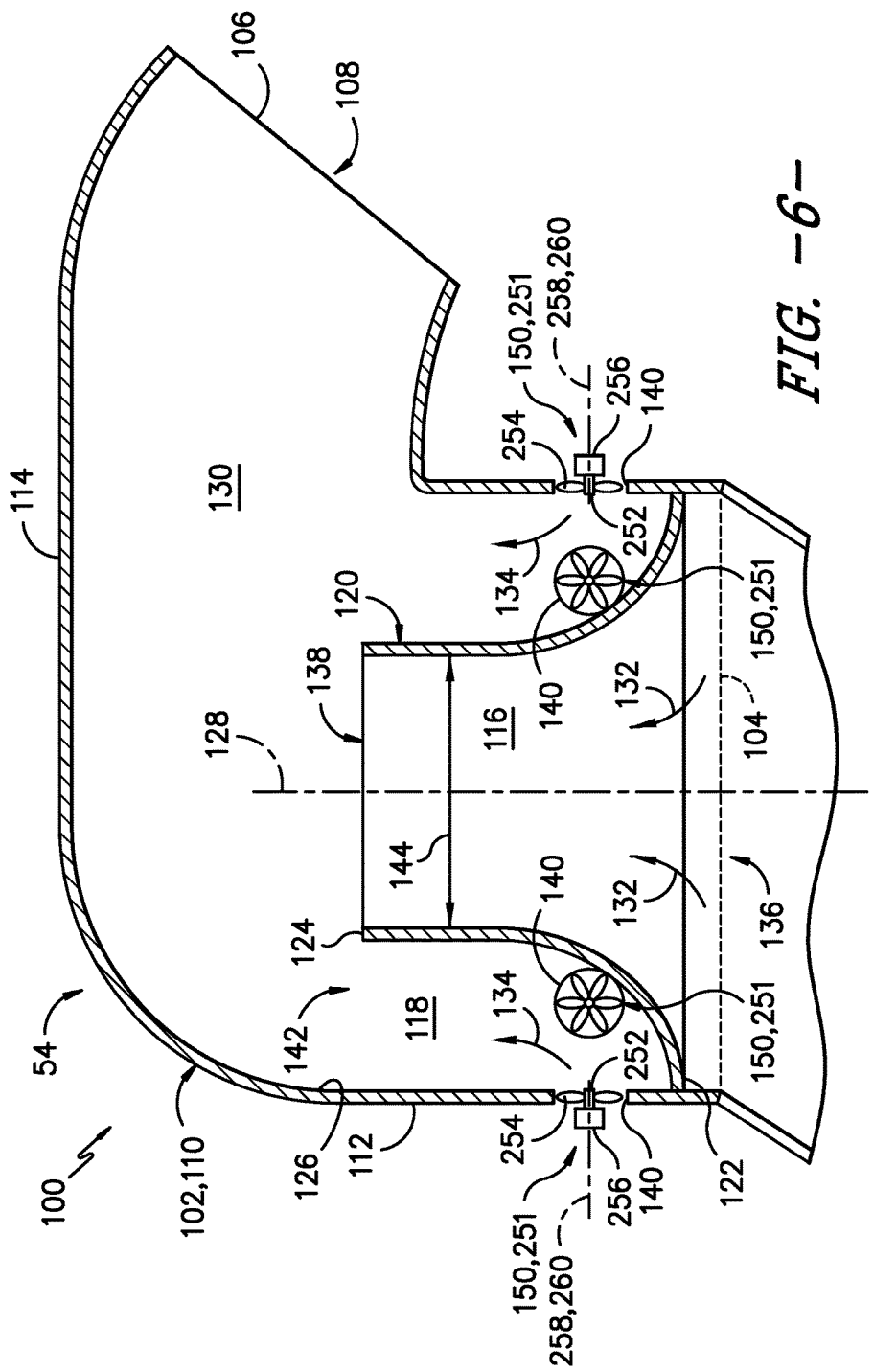
FIG. -6-

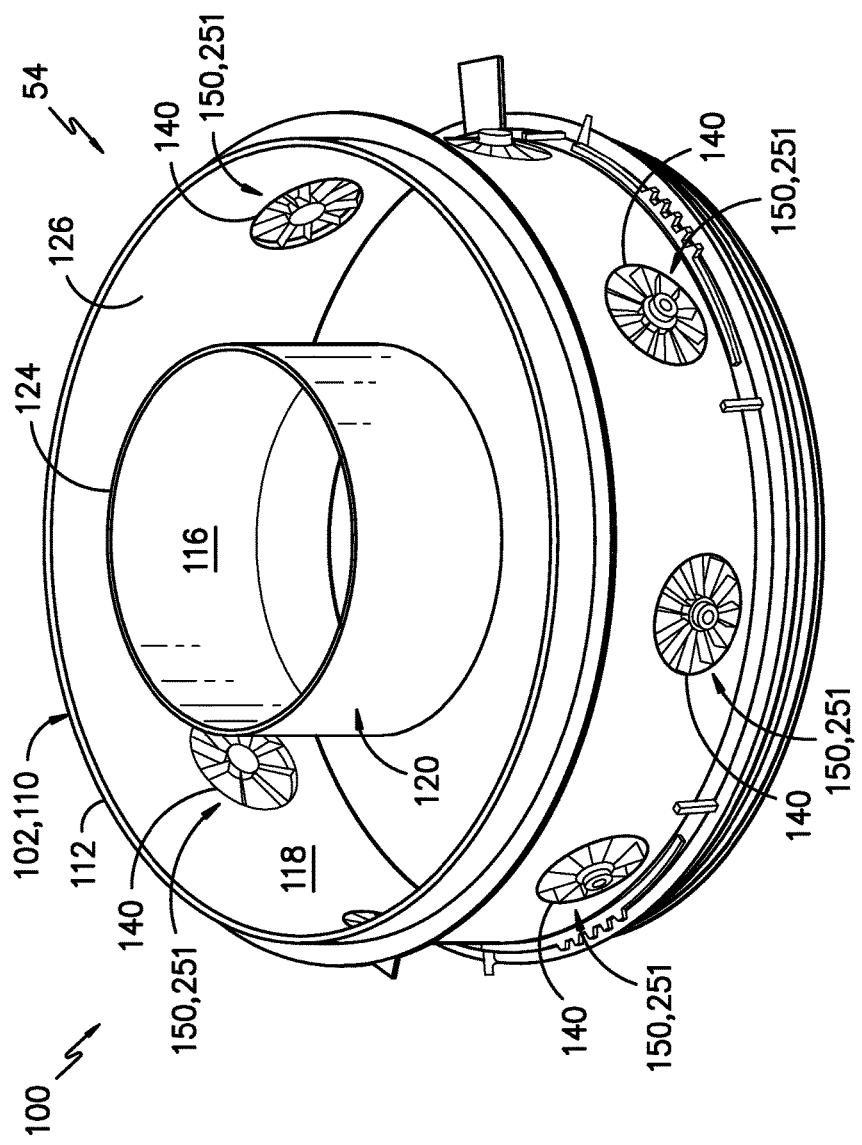
FIG. -7-

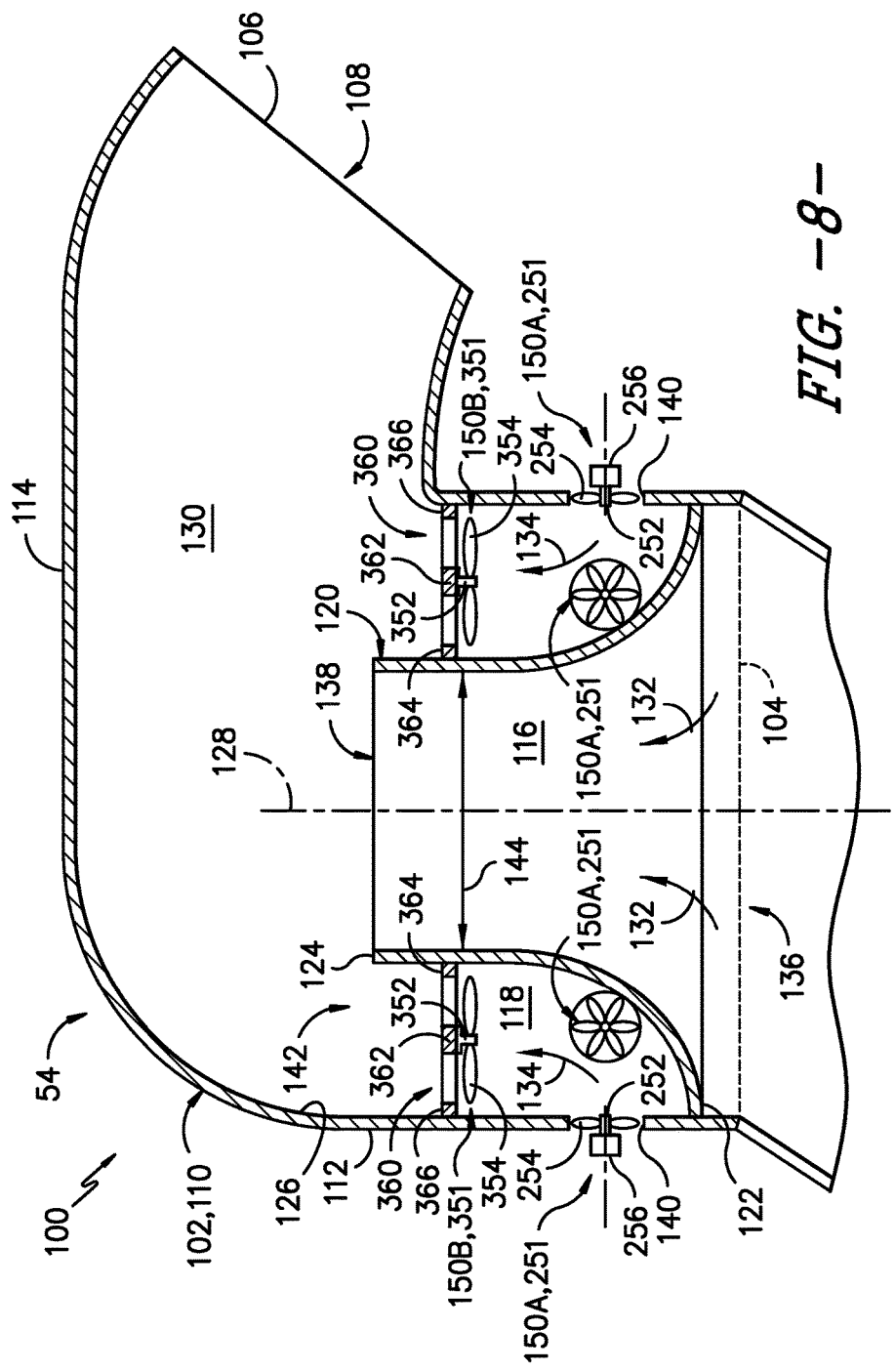

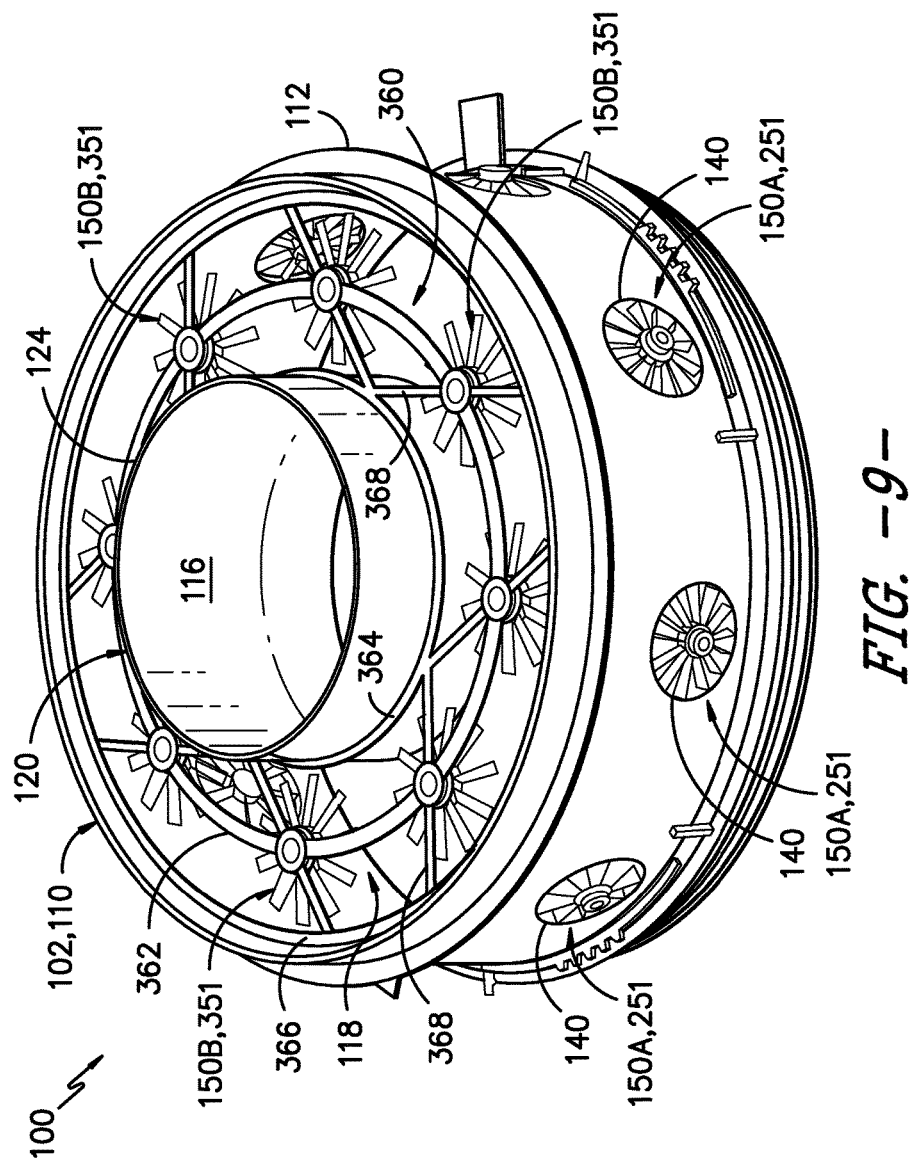
FIG. -9-

DEBRIS REMOVAL SYSTEM FOR AN AGRICULTURAL HARVESTER AND RELATED EXTRACTORS

FIELD OF THE INVENTION

The present subject matter relates generally to agricultural harvesters, such as sugar cane harvesters, and, more particularly, to a debris removal system for an agricultural harvester that utilizes one or more flow-generating devices provided in operative association with a radially outer airflow channel of an extractor to generate a suction force for removing debris through a central airflow channel of the extractor.

BACKGROUND OF THE INVENTION

Typically, agricultural harvesters include one or more extractors configured to separate and remove pieces of debris or thresh from a stream of harvested crops, such as a stream of sugar cane billets. For example, a sugarcane harvester often includes a primary extractor positioned near an intake end of an elevator assembly that conveys crops toward a receiver collecting the crops, and a secondary extractor positioned near a discharge end of the elevator assembly. For conventional sugarcane harvesters, both the primary extractor and the second extractor include an axial flow extractor fan positioned directly in-line with the flow of debris through the extractor. For instance, the extractor fan typically includes a large fan hub positioned in the center of the extractor, with fan blades extending radially outwardly from the hub. As such, conventional extractor fans occupy quite a large amount of space within the airflow channel of the extractor and, thus, provide a substantial obstruction to the flow of debris through the extractor.

Accordingly, an improved debris removal system for an agricultural harvester that generates a suction force for removing debris without obstructing the central flow path through the extractor would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a debris removal system for an agricultural harvester. The debris removal system may include a chopper assembly configured to chop harvested crops into billets and an elevator configured to receive a stream of billets from the chopper assembly. The system may also include an extractor configured to remove debris separated from the billets. The extractor may include an extractor housing defining a central airflow channel for directing the debris through the extractor from a central inlet of the housing to a central outlet of the housing. The extractor housing may further define an outer airflow channel surrounding the central airflow channel. The outer airflow channel may define a flow path between an outer housing inlet and an outer airflow outlet of the housing. Additionally, the extractor housing may include an internal divider wall extending between the central airflow channel and the outer airflow channel. Moreover, the system may include at least one flow-generating device provided in operative association with the housing. The flow-generating device(s) may be configured to generate an airflow directed through the flow path defined by the outer airflow channel, wherein the airflow generates a negative pressure within the central airflow channel that draws the debris into the extractor housing via the central airflow inlet.

In another aspect, the present subject matter is directed to an extractor for removing debris from crops harvested by an agricultural harvester. The extractor may generally include an extractor housing defining a central airflow channel for directing debris through the extractor from a central inlet of the housing to a central outlet of the housing. The extractor housing may further define an outer airflow channel surrounding the central airflow channel. The outer airflow channel may define a flow path between an outer housing inlet and an outer airflow outlet of the housing. Additionally, the extractor housing may include an internal divider wall extending between the central airflow channel and the outer airflow channel. The extractor may also include at least one flow-generating device provided in operative association with the housing. The flow-generating device(s) may be configured to generate an airflow directed through the flow path defined by the outer airflow channel, wherein the airflow generates a negative pressure within the central airflow channel that is configured to draw the debris into the extractor housing via the central airflow inlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, side view of one embodiment of a conventional agricultural harvester;

FIG. 2 illustrates a side view of a portion of the agricultural harvester, particularly illustrating the harvester including components of one embodiment of a debris removal system in accordance with aspects of the present subject matter, with a housing of the extractor defining both a central airflow channel and an outer airflow channel surrounding the central airflow channel;

FIG. 3 illustrates a cross-sectional view of a particular embodiment of the debris removal system shown in FIG. 2 in accordance with aspects of the present subject matter, particularly illustrating one embodiment of suitable flow-generating devices that may installed relative to the extractor housing in accordance with aspects of the present subject matter;

FIG. 4 illustrates a perspective view of a portion the extractor shown in FIG. 3, with a plurality of flow-generating devices installed around the outer perimeter of the extractor housing;

FIG. 5 illustrates a perspective, sectional view of the portion of the extractor shown in FIG. 4;

FIG. 6 illustrates a cross-sectional view of another embodiment of the debris removal system shown in FIG. 2 in accordance with aspects of the present subject matter, particularly illustrating a further embodiment of suitable flow-generating devices that may installed relative to the extractor housing in accordance with aspects of the present subject matter;

FIG. 7 illustrates a perspective view of a portion the extractor shown in FIG. 6, with a plurality of flow-generating devices installed around the outer perimeter of the extractor housing;

FIG. 8 illustrates a cross-sectional view of a further embodiment of the debris removal system shown in FIG. 2 in accordance with aspects of the present subject matter, particularly illustrating an embodiment of the system including two sets of flow-generating devices installed relative to the extractor housing in accordance with aspects of the present subject matter; and FIG. 9 illustrates a perspective view of a portion the extractor shown in FIG. 8, with a plurality of first flow-generating devices installed around the outer perimeter of the extractor housing and a plurality of second flow-generating devices installed within the interior of the extractor housing.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a debris removal system for an agricultural harvester. Specifically, in several embodiments, the system may include an extractor having a housing defining both a central airflow channel in flow communication with the stream of harvested crops passing underneath the extractor and an outer airflow channel surrounding the central airflow channel. Additionally, the system may include one or more flow-generating device(s) (e.g., one or more blowers, fan assemblies, etc.) installed relative to the extractor for generating an airflow through the outer airflow channel. In such an embodiment, as the airflow flow through the outer airflow channel and past the outlet of the central airflow channel, a suction force or negative pressure may be generated within the central airflow channel that draws debris upwardly through an inlet of the central airflow channel from the stream of harvested crops below the extractor. For instance, the suction force may be generated within the central airflow channel due to the venturi effect associated with the radially outer airflow flowing around the outlet of the central airflow channel. The debris sucked through the central airflow channel may then be diverted to an outlet of the extractor and, thus, may be expelled from the harvester.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester. 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continues to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 38.

Moreover, the harvester 10 may include a feed roller assembly 44 located downstream of the base cutter assembly 42 for moving the severed stalks of sugar cane from the base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" 51 which may be, for example, six (6) inches long. The billets 51 may then be propelled towards an elevator assembly 52 of the harvester 10 for delivery to an external receiver or storage device (not shown).

As is generally understood, pieces of debris 53 (e.g., dust, dirt, leaves, etc.) separated from the sugar cane billets 51 may be expelled from the harvester 10 through a primary extractor 54, which is located behind the chopper assembly 50 and is oriented to direct the debris 53 outwardly from the harvester 10. Additionally, an extractor fan 56 may be mounted at the base of the primary extractor 54 for generating a suction force or vacuum sufficient to pick up the debris 53 and force the debris 53 through the primary extractor 54. The debris 53 is then directed out of and away from harvester 10 via an outlet of the primary extractor 54. The separated or cleaned billets 51, heavier than the debris 53 being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets 51 on the elevator 60 as the billets 51 are elevated along a top span of the elevator 70 defines between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, pieces of debris 53 (e.g., dust, dirt, leaves, etc.) separated from the elevated sugar cane billets 51 may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, make them more uniform, and shake loose debris to pass through the bottom rollers 46 to the field 20. At the downstream end of the feed roller assembly 44, the chopper assembly 50 cuts or chops the compressed sugar cane stalks into pieces or billets 51. Airborne debris or chaff 53 (e.g., dust, dirt, leaves, etc.) separated from the sugar cane billets 51 is then extracted through the primary extractor 54 using suction created by the extractor fan 56. The separated/cleaned billets 51 then fall downwardly into the elevator assembly 52 and travel upwardly via the elevator 60 from its proximal end 62 to its distal end 64. During normal operation, once the billets 51 reach the distal end 64 of the elevator 60, the billets 51 fall through the discharge opening 82 to an external storage device. Similar to the primary extractor 54, chaff is blown out from harvester 10 through the secondary extractor 78 with the aid of the extractor fan 80.

Referring now to FIG. 2, a partial side view of the agricultural harvester 10 shown in FIG. 1 is illustrated, particularly illustrating a schematic view of one embodiment of a debris removal system 100 installed relative to the primary extractor 54 of the harvester 10 in accordance with aspects of the present subject matter. It should be appreciated that, in general, the system 100 described herein may be utilized to replace the extractor fan 56 of the primary extractor 54 and/or the extractor fan 80 of the secondary extractor 78 of a harvester 10. Thus, although the embodiments of the disclosed system 100 will generally be described herein with reference to the primary extractor 54, the system 100 may also be installed in operative associated with the secondary extractor 78 to serve as a replacement for its extractor fan 80.

In general, the system 100 may include an extractor, such as the primary extractor 54 shown in FIG. 2. As shown, the extractor 54 may include an extractor housing 102 extending between an inlet end (e.g., indicated by dashed line 104) and an outlet end 106, with an extractor outlet 108 being defined at the outlet end 106 of the housing 102 for expelling debris 53 from the extractor 54. Additionally, the housing 102 may include an outer housing wall 110 extending around the outer perimeter of the extractor 54 between the inlet and outlet ends 104, 106 of the housing 102. In such an embodiment, the outer housing wall 110 may correspond to a continuous wall member extending between the inlet and outer ends 104, 106 of the housing 102 or the housing wall 110 may correspond to two or more wall sections coupled together to form the outer perimeter of the extractor housing 102. For instance, as shown in FIG. 2, the extractor housing 102 may include both a cylindrically-shaped inlet or lower wall portion 112 extending upwardly from the inlet end 104 of the housing 102 and an associated hood-shaped upper wall portion 114 extending outwardly from the lower wall portion 112 to the outlet end 106 of the housing 102.

Moreover, in several embodiments, one or more airflow channels may be defined within the interior of the extractor housing 102 between its inlet and outlet ends 104, 106 for directing one or more corresponding airflows through the extractor 54. For example, as shown in FIG. 2, in one embodiment, the housing 102 may define both a central airflow channel 116 and an outer airflow channel 118 surrounding the central airflow channel 116. In such an embodiment, the housing 102 may also include an internal divider wall 120 extending between the airflow channels 116, 118 so as to divide or separate the central airflow channel 116 from the outer airflow channel 118 within the interior of the housing 102. For example, the divider wall 120 may be configured to define a radial boundary between the central airflow channel 116 and the outer airflow channel 118 as the wall 120 extends between its opposed ends (e.g., a bottom end 122 terminating at an inner surface 124 of the outer housing wall 110 and a top end 124 terminating at a location spaced apart from the inner surface 124 of the outer housing wall 110 within the interior of the housing 102), with the outer airflow channel 118 extending radially outwardly from the divider wall 120 to the outer housing wall 110 and the central airflow channel 116 extending radially inwardly from the divider wall 120 to a central axis 128 defined at the center of the extractor housing 102. In such an embodiment, the separate airflow channels 116, 118 may be configured to merge at the top end 124 of the internal divider wall 120 into a common airflow channel 130 extending between the top end 124 of the divider wall 120 and the extractor outlet 108.

It should be appreciated that, in one embodiment, the separate airflow channels 116, 118 may be coaxially aligned with each other along the central axis 128 of the extractor housing 102, such as along the cylindrically-shaped lower wall portion 112 of the housing 102. However, in other embodiments, the airflow channels 116, 118 need not be coaxially aligned with the central axis o128f the extractor housing 102.

As shown in FIG. 2, the central airflow channel 116 may generally be configured to define a flow path for directing a central airflow (e.g., as indicated by arrows 132) between a central inlet 136 and a central outlet 138 of the housing 102, with the central inlet 136 generally being defined at the inlet end 104 of the housing 102 and the central outlet 138 being defined at the top end 124 of the divider wall 120 at the intersection between the central airflow channel 116 and the common airflow channel 130. In such an embodiment, the central inlet 136 may be located directly above the stream of billets/debris 51, 53 passing between the chopper assembly 50 and the elevator assembly 52. Additionally, as shown in FIG. 2, the outer airflow channel 118 may generally be configured to define a flow path for directing an outer airflow (e.g., as indicated by arrows 134) between one or more outer housing inlets 140 and an outer airflow outlet 142, with the housing inlet(s) 140 being defined through the outer housing wall 110 and the outer airflow outlet 142 being defined at or adjacent to the top end 124 of the divider wall 120 at the intersection between the outer airflow channel 118 and the common airflow channel 130. In such an embodiment, the outer housing inlet(s) 140 may allow an airflow from the exterior of the housing 102 to enter the outer airflow channel 118 and flow upwardly through the channel 118 to the outer airflow outlet 142. As will be described below, in several embodiments, the extractor housing 102 may include a plurality of outer housing inlets 140 defined through the outer housing wall 110, with such inlets 140 being spaced apart circumferentially around the outer perimeter of the housing 102.

Additionally, the system 100 may include one or more flow-generating devices 150 provided in operative association with the extractor 54 for generating the outer airflow 134 through the outer airflow channel 118. Specifically, in several embodiments, the flow-generating device(s) 150 may be configured to generate an airflow 134 that flows from the outer housing inlet(s) 140 upwardly through the outer airflow channel 118 and is expelled from such channel 118 at the outer airflow outlet 142 into the common airflow channel 130. In accordance with aspects of the present subject matter, by directing such an upward airflow 134 through the outer airflow channel 118, a negative pressure or suction force may be generated within the central airflow channel 116 (at the central outlet 138 due to the venturi effect) that draws debris 53 upwardly away from the stream of billets 51 expelled from the chopper assembly 50 and into the central airflow channel 116 The debris 53 sucked into the central airflow channel 116 may then flow through such channel 116 via the central airflow 132 and be expelled into the common airflow channel 130 for subsequent delivery to the extractor outlet 108. The cleaned billets 51 may then fall onto the elevator assembly 52 for transport to a suitable receiver.

It should be appreciated that the flow-generating device(s) 150 may generally correspond to any suitable device(s) or mechanism(s) configured to generate an airflow through the outer airflow channel 118. For instance, as will be described below, in several embodiments, the flow-generating device(s) 150 may correspond to one or more blowers (e.g., centrifugal fans) coupled to the exterior of the housing 102 around the outer perimeter of the extractor 54. In such an embodiment, the blower(s) may be configured to direct one or more streams of air into the interior of the extractor housing 102 via the outer housing inlet(s) 140 for flow upwardly through the outer airflow channel 118, thereby allowing the airflow 134 flowing through the channel 118 to generate a negative pressure or vacuum within the central airflow channel 116. In another embodiment, the flow-generating device(s) 150 may correspond to one or more axial-flow fan assemblies coupled to the outer housing wall 110 and/or positioned within the housing 102 for generating a suitable airflow 134 through the outer airflow channel 118. Alternatively, the flow-generating device(s) 150 may correspond to any other suitable device and/or component configured to generate a suitable airflow 134 through the outer airflow channel 118.

It should also be appreciated that, in several embodiments, the divider wall 120 may be configured to converge inwardly away from the outer housing wall 110 as it extends from its bottom end 122 to its top end 124 such that a diameter 144 of the central airflow channel 116 is reduced from the central inlet 136 to the central outlet 138 of such airflow channel 116. For example, as shown in FIG. 2, the divider wall 120 may define a curved or arcuate profile that converges radially inwardly between the opposed ends 122, 124 of the wall 120. In such an embodiment, the diameter 144 of the central airflow channel 116 may vary between the central inlet 136 and the central outlet 138 in a non-linear manner. Alternatively, the divider wall 120 may define a straight profile that converges radially inwardly from the bottom end 122 to the top end 124 of the wall 120. In such an embodiment, the diameter 144 of the central airflow channel 116 may vary from the central inlet 136 to the central outlet 138 in a linear manner (e.g., such that the central airflow channel 116 defines a conical or cone-like shape between its opposed ends).

Referring now to FIGS. 3-5, a particular embodiment of the debris removal system 100 described above with reference to FIG. 2 is illustrated in accordance with aspects of the present subject matter, particularly illustrating one embodiment of a suitable arrangement and configuration for the flow-generating devices 150 of the system 100. Specifically, FIG. 3 illustrates a cross-sectional side view of the extractor 54 described above with reference to FIG. 2 having a plurality of flow-generating devices 150 installed around the outer perimeter of the housing 102. FIG. 4 illustrates a perspective view of a lower section of the extractor 54 shown in FIG. 3, particularly illustrating the flow-generating devices 150 spaced apart around the outer perimeter of the housing 102. Additionally, FIG. 5 illustrates a perspective, sectional view of the portion of the extractor 54 shown in FIG. 4.

As shown, the system 100 includes a plurality of flow-generating devices 150 coupled to the exterior of the extractor housing 102, with each flow-generating device 150 being spaced apart circumferentially around the outer perimeter of the housing 102. In such an embodiment, each flow-generating device 150 may be provided in flow communication or otherwise aligned with a corresponding housing inlet 140 of the extractor housing 102 for directing an airflow from each device 150 through its associated inlet 140 for flow through the outer airflow channel 134. For instance, in the illustrated embodiment, the system 100 includes eight flow-generating devices 150 coupled to the exterior of the lower wall portion 112 of the outer housing wall 108. In such an embodiment, eight corresponding housing inlets 140 may be defined through the lower wall portion 112 of the outer housing wall 110 to allow each outer housing inlet 140 to receive an airflow generated by its respective flow-generating device 150. However, in other embodiments, any other suitable number of flow-generating devices 150 may be utilized, such as a less than eight devices or more than eight devices, with a corresponding number of outer housing inlets 140 being defined through the outer housing wall 108 to allow the respective airflows to be directed through the outer airflow channel 118.

Additionally, as shown in FIG. 4 the flow-generating devices 150 are spaced apart circumferentially in equal intervals around the outer perimeter of the extractor housing 102 (e.g., 45 degree intervals). However, in other embodiments, the various flow-generating devices 150 need not be evenly spaced apart around the outer perimeter of the extractor housing 102, but, may instead, be spaced apart from one another using any suitable circumferential spacing interval.

As shown FIGS. 3-5, the flow-generating devices 150 correspond to electric blowers 151 (or centrifugal fans, also referred to as squirrel cage fans). In such an embodiment, as shown in FIG. 5, each blower 151 may include a housing 152 encasing a fan 154 (e.g., a plurality of blades, such as straight radial blades, forward-curved blades or backwards-curved blades, mounted to a suitable base or hub) and an electric motor 156 for rotationally driving the fan 154. Additionally, as shown in FIG. 5, each fan housing 152 may define a fan outlet 158 that is aligned with and/or received within one of the corresponding outlets 140 defined through the outer housing wall 110. Thus, the airflow exiting the housing outlet 158 may be directed through the adjacent housing inlet 140 and flow upwardly through the outer airflow channel 118 to allow a suction force or negative pressure to be generated within the central airflow channel 116 (e.g., via the venturi effect) for sucking debris out of the flow of crop/debris passing underneath the extractor 54.

Referring now to FIGS. 6 and 7, a further embodiment of the debris removal system 100 described above with reference to FIG. 2 is illustrated in accordance with aspects of the present subject matter, particularly illustrating another suitable arrangement and configuration for the flow-generating devices 150 of the system 100. Specifically, FIG. 6 illustrates a cross-sectional side view of the extractor 54 having a plurality of flow-generating devices 150 installed around the outer perimeter of the housing 102. Additionally, FIG. 7 illustrates a perspective view of a lower section of the extractor 54 shown in FIG. 6, particularly illustrating the flow-generating devices 150 spaced apart around the outer perimeter of the housing 102.

As shown in FIGS. 6 and 7, unlike the embodiment described above with reference to FIGS. 3-5, the flow-generating devices 150 correspond to axial-flow fan assemblies 251 installed within each outer housing inlet 140 defined through the outer housing wall 110. Specifically, each axial-flow fan assembly 251 includes a fan hub 252 positioned centrally within its associated housing inlet 140 and a plurality of blades 254 extending radially outwardly from the fan hub 252 towards the outer circumference of the adjacent inlet 140. In such an embodiment, a rotational driver, such as an electric motor 256 (FIG. 6), may be coupled to the fan hub 252 to rotationally drive the fan assembly 251. For instance, the motor 256 may be configured rotate the blades 254 relative to the housing 102 about a rotational axis 258 that is coaxially aligned with a central axis 260 of the associated housing inlet 240. In the illustrated embodiment, the fan assemblies 251 may be operated to generate an airflow that flows through each outer housing inlet 140 and is directed upwardly through the outer airflow channel 118 to generate a suction force or negative pressure within the central airflow channel 116 (e.g., via the venturi effect) for sucking debris out of the flow of crop/debris passing underneath the extractor 54.

As shown in the illustrated embodiment, the system 100 includes eight axial-flow fan assemblies 251 installed relative the extractor housing 102, with the fan assemblies 251 being spaced apart circumferentially in equal intervals around the outer perimeter of the extractor 54 (e.g., 45 degree intervals). However, in other embodiments, the system 100 may include less than eight fan assemblies 251 installed relative the extractor housing 102 or greater than eight fan assemblies 251 installed relative the extractor housing 102. Additionally, it should be appreciated that the various fan assemblies 251 need not be evenly spaced apart around the outer perimeter of the extractor 54, but, may instead, be spaced apart from one another using any suitable circumferential spacing interval.

Referring now to FIGS. 8 and 9, a variation of the embodiment of the debris removal system 100 shown in FIGS. 6 and 7 is illustrated in accordance with aspects of the present subject matter. Specifically, FIG. 8 illustrates a cross-sectional side view of the extractor 54 having a plurality of first flow-generating devices 150A installed around the outer perimeter of the housing 102 and a plurality of second flow-generating devices 150B installed within the interior of the housing 102. Additionally, FIG. 9 illustrates a perspective view of a lower section of the extractor 54 shown in FIG. 8, particularly illustrating the various flow-generating devices 150A, 150B installed relative to the housing 102.

As shown in FIGS. 8 and 9, the system 100 includes two sets of flow-generating devices installed relative to the extractor housing 102, namely a plurality of first flow-generating devices 150A installed around the outer perimeter of the housing 102 and a plurality of second flow-generating devices 150B installed within the interior of the housing 102. In one embodiment, the first flow-generating devices 150A may be configured similar to the flow-generating devices described above with reference to FIGS. 6 and 7. For instance, as shown in FIGS. 8 and 9, the first flow-generating devices 150A correspond to axial-flow fan assemblies 251 installed within each housing inlet 140 defined through the outer housing wall 110, with each fan assembly 251 including a fan hub 252 positioned centrally within its associated housing inlet 140 and a plurality of blades 254 extending radially outwardly from the fan hub 252 towards the outer circumference of the adjacent inlet 140. As indicated above, a rotational driver, such as an electric motor 256, may be coupled to the fan hub 252 to rotationally drive the blades 254, thereby allowing an airflow to be directed through the outer airflow channel 118 to generate a suction force or negative pressure within the central airflow channel 116 (e.g., via the venturi effect) for sucking debris out of the flow of crop/debris passing underneath the extractor 54.

Alternatively, the first flow-generating devices 150A may have any other suitable configuration. For instance, in another embodiment, the first flow-generating devices 150A may be configured similar to the flow-generating devices described above with reference to FIGS. 3-5. In such an embodiment, the first flow-generating devices 150A may correspond to centrifugal fans or blowers 151 configured to be mounted to the exterior of the housing 102 around the outer perimeter of the extractor 54.

Additionally, as shown in FIGS. 8 and 9, the second flow-generating devices 150B may, in one embodiment, correspond to axial-flow fan assemblies 351 positioned within the outer airflow channel 118 between the outer housing inlets 140 and the outer airflow outlet 152 defined at the top end 124 of the divider wall 120. In such an embodiment, the internally located axial-flow fan assemblies 351 may be configured to assist in generating the upwardly directed airflow through the outer airflow channel 118. As shown in FIGS. 8 and 9, similar to the outer fan assemblies 251, each inner fan assembly 351 may include a fan hub 352 and a plurality of blades 354 extending radially outwardly from the fan hub 352. Additionally, a rotational driver (not shown), such as an electric motor, may be coupled to the fan hub 352 for rotationally driving the blades 354.

Moreover, as shown in FIGS, 8 and 9, a support structure 360 may be positioned between the outer housing wall 110 and the internal divider wall 120 for supporting the second flow-generating devices 150B within the outer airflow channel 118. For instance, as particularly shown in FIG. 9, the support structure 360 may include a central support member 362 (e.g., an annular or ring-shape frame) centrally positioned between the outer housing wall 110 and the internal divider wall 120 to which each fan assembly 251 is mounted. Additionally, the support structure 360 may include a radially inner support member 364 (e.g., an annular or ring-shape frame) coupled to or supported by the divider wall 130 and a radially outer support member 366 (e.g., an annular or ring-shape frame) coupled to or supported by the outer housing wall 110. As shown in FIG. 9, one or more cross support members 368 may be coupled between the central support member 362 and the inner and outer support members 364, 366 to allow the central support member 362 to be vertically supported within the outer airflow channel 118 via the inner and outer support members 364, 366.

It should be appreciated that, in other embodiments, the system 100 may simply include the second flow-generating devices 150B without inclusion of the first flow-generating devices 150A. In such an embodiment, the second flow-generating devices 150B may serve as the primary or sole means for generating the upward airflow through the outer airflow channel 118.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A debris removal system for an agricultural harvester, the debris removal system comprising:
   a chopper assembly configured to chop harvested crops into billets;
   an elevator configured to receive a stream of billets from the chopper assembly;
   an extractor configured to remove debris separated from the billets, the extractor including an extractor housing defining a central airflow channel for directing the debris through the extractor from a central inlet of the housing to a central outlet of the housing, the extractor housing further defining an outer airflow channel surrounding the central airflow channel, the outer airflow channel defining a flow path between an outer housing inlet and an outer airflow outlet of the housing, the extractor housing including an internal divider wall extending between the central airflow channel and the outer airflow channel; and
   at least one flow-generating device provided in operative association with the housing, the at least one flow-generating device generating an airflow directed through the flow path defined by the outer airflow channel,
   wherein the airflow generates a negative pressure within the central airflow channel that draws the debris into the extractor housing via the central airflow inlet,
   wherein the internal divider wall defines a boundary between the central airflow channel and the outer airflow channel such that the internal divider wall separates the debris drawn through the central airflow channel from the airflow directed through the flow path defined by the outer airflow channel.

2. The debris removal system of claim 1, wherein the divider wall extends between a bottom end positioned at or adjacent to an inner surface of an outer housing wall of the housing and a top end spaced apart from the inner surface of the outer housing wall, the top end of the divider wall dividing the central outlet from the outer airflow outlet within an interior of the housing.

3. The debris removal system of claim 2, wherein the divider wall converges radially inwardly as the divider wall extends from its bottom end to its top end such that a diameter of the central airflow channel decreases between the bottom and top ends of the divider wall.

4. The debris removal system of claim 1, wherein the central airflow channel and the outer airflow channel are concentrically aligned with a central axis of the extractor housing.

5. The debris removal system of claim 1, wherein the outer housing outlet is defined through an outer housing wall of the housing forming an outer perimeter of the extractor, the at least one flow-generating device being provided in flow communication with the outer housing outlet along the outer perimeter of the extractor.

6. The debris removal system of claim 5, wherein the at least one flow-generating device comprises at least one blower configured to generate the airflow through the outer airflow channel.

7. The debris removal system of claim 6, wherein the at least one blower comprises a plurality of blowers spaced apart circumferentially from one another around the outer perimeter of the extractor.

8. The debris removal system of claim 5, wherein the at least one flow-generating device comprises at least one axial-flow fan assembly configured to generate the airflow through the outer airflow channel.

9. The debris removal system of claim 8, wherein the at least one axial-flow fan assembly is installed within the outer housing inlet defined through the outer housing wall of the housing.

10. The debris removal system of claim 8, further comprising a plurality of outer housing inlets defined through the outer housing wall of the housing, the at least one axial-flow fan assembly comprising a plurality of axial-flow fan assemblies spaced apart circumferentially from one another around the outer perimeter of the extractor housing, each axial-flow fan assembly being installed within a corresponding outer housing inlet of the plurality of outer housing inlets.

11. The debris removal system of claim 1, wherein the at least one flow-generating device is positioned within the outer airflow channel along the flow path defined between the outer housing inlet and outer airflow outlet.

12. The debris removal system of claim 11, wherein the at least one flow-generating device comprises at least one axial-flow fan assembly positioned within the outer airflow channel.

13. The debris removal system of claim 11, further comprising a support structure configured to support the at least one flow-generating device positioned within the outer airflow channel.

14. The debris removal system of claim 1, wherein the extractor comprises a primary extractor or a secondary extractor for the agricultural harvester.

15. An extractor for removing debris from crops harvested by an agricultural harvester, the extractor comprising:
an extractor housing defining a central airflow channel through which debris is directed from a central inlet of the housing to a central outlet of the housing, the extractor housing further defining an outer airflow channel surrounding the central airflow channel, the outer airflow channel defining a flow path between an outer housing inlet and an outer airflow outlet of the housing, the extractor housing including an internal divider wall extending between the central airflow channel and the outer airflow channel; and
at least one flow-generating device provided in operative association with the housing, the at least one flow-generating device generating an airflow directed through the flow path defined by the outer airflow channel,
wherein the airflow generates a negative pressure within the central airflow channel that is configured to draw the debris into the extractor housing via the central airflow inlet,
wherein the internal divider wall defines a boundary between the central airflow channel and the outer airflow channel such that the internal divider wall separates the debris drawn through the central airflow channel from the airflow directed through the flow path defined by the outer airflow channel.

16. The extractor of claim 15, wherein the divider wall extends between a bottom end positioned at or adjacent to an inner surface of an outer housing wall of the housing and a top end spaced apart from the inner surface of the outer housing wall, the top end of the divider wall dividing the central outlet from the outer airflow outlet within an interior of the housing.

17. The extractor of claim 16, wherein the divider wall converges radially inwardly as the divider wall extends from its bottom end to its top end such that a diameter of the central airflow channel decreases between the bottom and top ends of the divider wall.

18. The extractor of claim 15, wherein the at least one flow-generating device comprises at least one blower provided in flow communication with the outer housing inlet along an outer perimeter of the extractor.

19. The extractor of claim 15, wherein the at least one flow-generating device comprises at least one axial-flow fan assembly installed within the outer housing inlet or within the outer airflow channel.

20. The extractor of claim 15, wherein the extractor comprises a primary extractor or a secondary extractor for the agricultural harvester.

* * * * *